(12) United States Patent
Danilov et al.

(10) Patent No.: US 10,942,827 B2
(45) Date of Patent: Mar. 9, 2021

(54) REPLICATION OF DATA IN A GEOGRAPHICALLY DISTRIBUTED STORAGE ENVIRONMENT

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 135 days.

(21) Appl. No.: 16/254,073

(22) Filed: Jan. 22, 2019

(65) Prior Publication Data
US 2020/0233764 A1 Jul. 23, 2020

(51) Int. Cl.
G06F 11/20 (2006.01)

(52) U.S. Cl.
CPC ...... *G06F 11/2094* (2013.01); *G06F 2201/82* (2013.01)

(58) Field of Classification Search
CPC .......................... G06F 11/2053; G06F 11/2094
See application file for complete search history.

(56) References Cited

U.S. PATENT DOCUMENTS

| | | |
|---|---|---|
| 5,261,033 A | 11/1993 | Oka |
| 5,502,243 A | 3/1996 | Waller et al. |
| 5,675,802 A | 10/1997 | Allen et al. |
| 5,805,788 A | 9/1998 | Johnson |
| 5,950,225 A | 9/1999 | Kleiman |
| 7,389,393 B1 | 6/2008 | Karr et al. |
| 7,577,091 B2 | 8/2009 | Antal et al. |
| 7,631,051 B1 | 12/2009 | Fein et al. |
| 7,664,839 B1 | 2/2010 | Kan-et al. |
| 7,680,875 B1 | 3/2010 | Shopiro et al. |
| 7,721,044 B1 | 5/2010 | Chatterjee et al. |
| 8,125,406 B1 | 2/2012 | Jensen et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,751,599 B2 | 6/2014 | Tran et al. |
| 8,751,740 B1 | 6/2014 | De Forest et al. |

(Continued)

OTHER PUBLICATIONS

Non-Final Office Action received for U.S. Appl. No. 15/582,167 dated Sep. 7, 2018, 19 pages.

(Continued)

*Primary Examiner* — Joseph R Kudirka
(74) *Attorney, Agent, or Firm* — Amin, Turocy & Watson, LLP

(57) ABSTRACT

Described herein, system that facilitates replication of data in a geographically distributed storage environment. According to an embodiment, a system can comprise storing a first data chunk at a first site of a first region in a geographically diverse data storage system, determining a second region in the geographically diverse data storage system for storage of a first copy of the first data chunk, wherein the first copy is stored at a second site located within the second region, and determining a third region in the geographically diverse data storage system for storage of a second copy of the first data chunk, wherein the second copy is stored at a third site located within the third region.

20 Claims, 11 Drawing Sheets

(56) References Cited

U.S. PATENT DOCUMENTS

| | | | |
|---|---|---|---|
| 8,799,746 B2 | 8/2014 | Baker et al. | |
| 8,832,234 B1 | 9/2014 | Brooker et al. | |
| 8,856,619 B1 * | 10/2014 | Cypher | G06F 11/1044 |
| | | | 714/770 |
| 8,972,478 B1 | 3/2015 | Storer et al. | |
| 9,003,086 B1 | 4/2015 | Schuller et al. | |
| 9,052,942 B1 | 6/2015 | Barber et al. | |
| 9,063,838 B1 | 6/2015 | Boyle et al. | |
| 9,098,447 B1 | 8/2015 | Donlan et al. | |
| 9,208,009 B2 | 12/2015 | Resch et al. | |
| 9,218,135 B2 | 12/2015 | Miller et al. | |
| 9,244,761 B2 * | 1/2016 | Yekhanin | H03M 13/293 |
| 9,268,783 B1 | 2/2016 | Shilane et al. | |
| 9,274,903 B1 * | 3/2016 | Garlapati | G06F 11/1658 |
| 9,280,430 B2 * | 3/2016 | Sarfare | G06F 11/2056 |
| 9,405,483 B1 | 8/2016 | Wei et al. | |
| 9,477,682 B1 | 10/2016 | Bent et al. | |
| 9,641,615 B1 | 5/2017 | Robins et al. | |
| 9,665,428 B2 | 5/2017 | Vairavanathan et al. | |
| 9,747,057 B1 | 8/2017 | Ramani et al. | |
| 9,817,713 B2 | 11/2017 | Gupta et al. | |
| 9,864,527 B1 | 1/2018 | Srivastav et al. | |
| 9,942,084 B1 | 4/2018 | Sorenson, III | |
| 10,001,947 B1 | 6/2018 | Chatterjee et al. | |
| 10,055,145 B1 | 8/2018 | Danilov et al. | |
| 10,127,234 B1 | 11/2018 | Krishnan et al. | |
| 10,216,770 B1 | 2/2019 | Kulesza et al. | |
| 10,242,022 B1 | 3/2019 | Jain et al. | |
| 10,282,262 B2 | 5/2019 | Panara et al. | |
| 10,289,488 B1 | 5/2019 | Danilov et al. | |
| 10,331,516 B2 | 6/2019 | Danilov et al. | |
| 10,361,810 B2 | 7/2019 | Myung et al. | |
| 10,496,330 B1 | 12/2019 | Bernat et al. | |
| 10,503,611 B1 | 12/2019 | Srivastav et al. | |
| 10,579,490 B2 | 3/2020 | Danilov et al. | |
| 10,613,780 B1 | 4/2020 | Naeni et al. | |
| 10,733,053 B1 | 8/2020 | Miller et al. | |
| 10,797,863 B2 | 10/2020 | Chen et al. | |
| 2002/0166026 A1 | 11/2002 | Ulrich et al. | |
| 2005/0080982 A1 | 4/2005 | Vasilevsky et al. | |
| 2005/0088318 A1 | 4/2005 | Liu et al. | |
| 2005/0108775 A1 | 5/2005 | Bachar et al. | |
| 2005/0140529 A1 | 6/2005 | Choi et al. | |
| 2005/0234941 A1 | 10/2005 | Watanabe | |
| 2006/0047896 A1 | 3/2006 | Nguyen et al. | |
| 2006/0075007 A1 | 4/2006 | Anderson et al. | |
| 2006/0143508 A1 | 6/2006 | Mochizuki et al. | |
| 2006/0265211 A1 | 11/2006 | Canniff et al. | |
| 2007/0076321 A1 | 4/2007 | Takahashi et al. | |
| 2007/0239759 A1 | 10/2007 | Shen et al. | |
| 2007/0250674 A1 | 10/2007 | Findberg et al. | |
| 2008/0222480 A1 | 9/2008 | Huang et al. | |
| 2008/0222481 A1 | 9/2008 | Huang et al. | |
| 2008/0244353 A1 | 10/2008 | Dholakia et al. | |
| 2008/0320061 A1 | 12/2008 | Aszmann et al. | |
| 2009/0070771 A1 | 3/2009 | Yuyitung et al. | |
| 2009/0113034 A1 | 4/2009 | Krishnappa et al. | |
| 2009/0172464 A1 | 7/2009 | Byrne et al. | |
| 2009/0183056 A1 | 7/2009 | Aston | |
| 2009/0204959 A1 | 8/2009 | Anand et al. | |
| 2009/0240880 A1 | 9/2009 | Kawaguchi | |
| 2009/0259882 A1 | 10/2009 | Shellhamer | |
| 2010/0031060 A1 | 2/2010 | Chew et al. | |
| 2010/0218037 A1 | 8/2010 | Swartz et al. | |
| 2010/0293348 A1 | 11/2010 | Ye et al. | |
| 2010/0332748 A1 | 12/2010 | Van der Goot et al. | |
| 2011/0029836 A1 | 2/2011 | Dhuse et al. | |
| 2011/0106972 A1 | 5/2011 | Grube et al. | |
| 2011/0107165 A1 | 5/2011 | Resch et al. | |
| 2011/0138148 A1 | 6/2011 | Friedman et al. | |
| 2011/0161712 A1 | 6/2011 | Athalye et al. | |
| 2011/0196833 A1 | 8/2011 | Drobychev et al. | |
| 2011/0246503 A1 | 10/2011 | Bender et al. | |
| 2011/0292054 A1 | 12/2011 | Boker et al. | |
| 2012/0023291 A1 | 1/2012 | Zeng et al. | |
| 2012/0096214 A1 | 4/2012 | Lu et al. | |
| 2012/0191675 A1 | 7/2012 | Kim et al. | |
| 2012/0191901 A1 | 7/2012 | Norair | |
| 2012/0204077 A1 | 8/2012 | D'Abreu et al. | |
| 2012/0233117 A1 | 9/2012 | Holt et al. | |
| 2012/0311395 A1 | 12/2012 | Leggette et al. | |
| 2012/0317234 A1 | 12/2012 | Bohrer et al. | |
| 2012/0321052 A1 | 12/2012 | Morrill et al. | |
| 2013/0047187 A1 | 2/2013 | Frazier et al. | |
| 2013/0054822 A1 | 2/2013 | Mordani et al. | |
| 2013/0067159 A1 | 3/2013 | Mehra | |
| 2013/0067187 A1 | 3/2013 | Moss et al. | |
| 2013/0088501 A1 | 4/2013 | Fell | |
| 2013/0097470 A1 | 4/2013 | Hwang et al. | |
| 2013/0145208 A1 | 6/2013 | Yen et al. | |
| 2013/0238932 A1 | 9/2013 | Resch | |
| 2013/0246876 A1 | 9/2013 | Manssour et al. | |
| 2013/0290482 A1 | 10/2013 | Leggette | |
| 2013/0305365 A1 | 11/2013 | Rubin et al. | |
| 2014/0040417 A1 | 2/2014 | Galdwin et al. | |
| 2014/0064048 A1 | 3/2014 | Cohen et al. | |
| 2014/0115182 A1 | 4/2014 | Sabaa et al. | |
| 2014/0164430 A1 | 6/2014 | Hadjieleftheriou et al. | |
| 2014/0164694 A1 | 6/2014 | Storer | |
| 2014/0250450 A1 | 9/2014 | Yu et al. | |
| 2014/0280375 A1 | 9/2014 | Rawson et al. | |
| 2014/0281804 A1 | 9/2014 | Resch | |
| 2014/0297955 A1 | 10/2014 | Yamazaki et al. | |
| 2014/0331100 A1 | 11/2014 | Dhuse et al. | |
| 2014/0358972 A1 | 12/2014 | Guarrieri et al. | |
| 2014/0359244 A1 | 12/2014 | Chambliss et al. | |
| 2014/0380088 A1 | 12/2014 | Bennett et al. | |
| 2014/0380125 A1 | 12/2014 | Calder et al. | |
| 2015/0006846 A1 | 1/2015 | Youngworth | |
| 2015/0074065 A1 | 3/2015 | Christ et al. | |
| 2015/0112951 A1 | 4/2015 | Narayanamurthy et al. | |
| 2015/0134626 A1 | 5/2015 | Theimer et al. | |
| 2015/0142863 A1 | 5/2015 | Yuen et al. | |
| 2015/0178007 A1 | 6/2015 | Moisa et al. | |
| 2015/0186043 A1 | 7/2015 | Kesselman et al. | |
| 2015/0269025 A1 | 9/2015 | Krishnamurthy et al. | |
| 2015/0303949 A1 | 10/2015 | Jafarkhani et al. | |
| 2015/0331766 A1 | 11/2015 | Sarfare et al. | |
| 2015/0370656 A1 | 12/2015 | Tsafrir et al. | |
| 2016/0011935 A1 | 1/2016 | Luby | |
| 2016/0011936 A1 | 1/2016 | Luby | |
| 2016/0055054 A1 | 2/2016 | Patterson, III et al. | |
| 2016/0162378 A1 | 6/2016 | Garlapati et al. | |
| 2016/0169692 A1 | 6/2016 | Gupta | |
| 2016/0170668 A1 | 6/2016 | Mehra | |
| 2016/0217104 A1 | 7/2016 | Kamble et al. | |
| 2016/0232055 A1 | 8/2016 | Vairavanathan et al. | |
| 2016/0253400 A1 | 9/2016 | McAlister et al. | |
| 2016/0277497 A1 | 9/2016 | Bannister et al. | |
| 2016/0292429 A1 | 9/2016 | Bannister et al. | |
| 2016/0328295 A1 | 11/2016 | Baptist et al. | |
| 2016/0357649 A1 | 12/2016 | Karrotu et al. | |
| 2016/0371145 A1 | 12/2016 | Akutsu et al. | |
| 2016/0378624 A1 | 12/2016 | Jenkins, Jr. et al. | |
| 2016/0380650 A1 | 12/2016 | Calder et al. | |
| 2017/0003880 A1 | 1/2017 | Fisher et al. | |
| 2017/0004044 A1 | 1/2017 | Tormasov et al. | |
| 2017/0017671 A1 | 1/2017 | Baptist et al. | |
| 2017/0031945 A1 | 2/2017 | Sarab et al. | |
| 2017/0097875 A1 | 4/2017 | Jess et al. | |
| 2017/0102993 A1 | 4/2017 | Hu et al. | |
| 2017/0116088 A1 | 4/2017 | Anami et al. | |
| 2017/0187398 A1 | 6/2017 | Trusov | |
| 2017/0187766 A1 | 6/2017 | Zheng et al. | |
| 2017/0206025 A1 | 7/2017 | Viswanathan | |
| 2017/0206135 A1 | 7/2017 | Zeng | |
| 2017/0212680 A1 | 7/2017 | Waghulde | |
| 2017/0212845 A1 | 7/2017 | Conway | |
| 2017/0235507 A1 | 8/2017 | Sinha et al. | |
| 2017/0262187 A1 | 9/2017 | Manzanares et al. | |
| 2017/0268900 A1 | 9/2017 | Nicolaas et al. | |
| 2017/0286516 A1 | 10/2017 | Horowitz et al. | |
| 2017/0288701 A1 | 10/2017 | Slik | |
| 2017/0344285 A1 | 11/2017 | Choi et al. | |

(56) References Cited

U.S. PATENT DOCUMENTS

| | | |
|---|---|---|
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Daniliv et al. |
| 2018/0181475 A1 | 6/2018 | Danilov et al. |
| 2018/0181612 A1 | 6/2018 | Daniliv et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Non-Final Office Action received for U.S. Appl. No. 15/952,179 dated Apr. 20, 2020, 68 pages.
Notice of Allowance dated May 4, 2020 for U.S. Appl. No. 16/240,193, 46 pages.
Office Action dated May 11, 2020 for U.S. Appl. No. 16/177,278, 53 pages.
Office Action dated May 8, 2020 for U.S. Appl. No. 16/231,018, 78 pages.
Notice of Allowance dated May 11, 2020 for U.S. Appl. No. 16/240,193, 24 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.

(56) References Cited

OTHER PUBLICATIONS

Final Office Action received for U.S. Appl. No. 15/791,390 dated Feb. 6, 2020, 29 pages.

Non-Final Office Action received for U.S. Appl. No. 15/791,390 dated Apr. 30, 2020, 48 pages.

Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.

Non-Final Office Action received for U.S. Appl. No. 16/457,615 dated Jul. 20, 2020, 34 pages.

Final Office Action received for U.S. Appl. No. 16/010,255 dated Jul. 23, 2020, 36 pages.

Office Action received for U.S. Appl. No. 16/010,246 dated Jul. 27, 2020 36 pages.

Office Action received for U.S. Appl. No. 16/177,278, dated Aug. 21, 2020, 53 pages.

Office Action received for U.S. Appl. No. 16/179,486, dated Aug. 13, 2020, 64 pages.

Guo et al., "GeoScale: Providing Geo-Elasticity in Distributed Clouds" 2016 IEEE International Conference on Cloud Engineering, 4 pages.

Guo et al., "Providing Geo-Elasticity in Geographically Distributed Clouds". ACM Transactions on Internet Technology, vol. 18, No. 3, Article 38. Apr. 2018. 27 pages.

Non-Final Office Action received for U.S. Appl. No. 16/526,142 dated Oct. 15, 2020, 21 pages.

Notice of Allowance received U.S. Appl. No. 16/228,612 dated Oct. 20, 2020, 84 pages.

Thou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.

Non-Final Office Action received for U.S. Appl. No. 16/010,255 dated Oct. 29, 2020, 65 pages.

Final Office Action received for U.S. Appl. No. 16/240,272 dated Oct. 27, 2020, 42 pages.

Non-Final Office Action received for U.S. Appl. No. 16/399,902 dated Oct. 28, 2020, 83 pages.

Notice of Allowance received for U.S. Appl. No. 16/374,726 dated Nov. 20, 2020, 78 pages.

Final Office Action received for U.S. Appl. No. 16/228,624 dated Dec. 1, 2020, 63 pages.

Non-Final Office Action received for U.S. Appl. No. 16/570,657 dated Nov. 27, 2020, 75 pages.

Final Office Action received for U.S. Appl. No. 16/177,285 dated Dec. 30, 2020, 61 pages.

Final Office Action received for U.S. Appl. No. 16/511,161 dated Dec. 30, 2020, 61 pages.

Non-Final Office Action received for U.S. Appl. No. 16/399,895 dated Jan. 4, 2021, 64 pages.

Notice of Allowance received for U.S. Appl. No. 16/374,726 dated Jan. 6, 2021, 56 pages.

\* cited by examiner

REPLICATION OF DATA IN A GEOGRAPHICALLY DISTRIBUTED STORAGE ENVIRONMENT

TECHNICAL FIELD

The subject disclosure relates generally to storage systems. More specifically, this disclosure relates to various embodiments for replication of data in a geographically distributed storage environment.

BACKGROUND

The large increase in amount of data generated by digital systems has created a new set of challenges for data storage environments. Traditional storage area network (SAN) and/or network-attached storage (NAS) architectures have not been designed to support data storage and/or protection at large multi-petabyte capacity levels. Object storage technology can be utilized to meet these requirements. By utilizing object storage technology, organizations can not only keep up with rising capacity levels, but can also store these new capacity levels at a manageable cost point.

Typically, a scale-out, cluster-based, shared-nothing object storage that employs a microservices architecture pattern, for example, an ECS™ (formerly known as Elastic Cloud Storage) can be utilized as a storage environment for a new generation of workloads. ECS™ utilizes the latest trends in software architecture and development to achieve increased availability, capacity use efficiency, and performance. ECS™ uses a specific method for disk capacity management, wherein disk space is partitioned into a set of blocks of fixed size called chunks. User data is stored in these chunks and the chunks are shared. One chunk can comprise fragments of several user objects (e.g., object segments). Chunk content is modified in an append mode. When chunks become full, they are sealed, and the content of sealed chunks is immutable.

The above-described background relating to ECS™ is merely intended to provide a contextual overview of some current issues, and is not intended to be exhaustive. Other contextual information may become further apparent upon review of the following detailed description.

DETAILED DESCRIPTION

Figure 1:
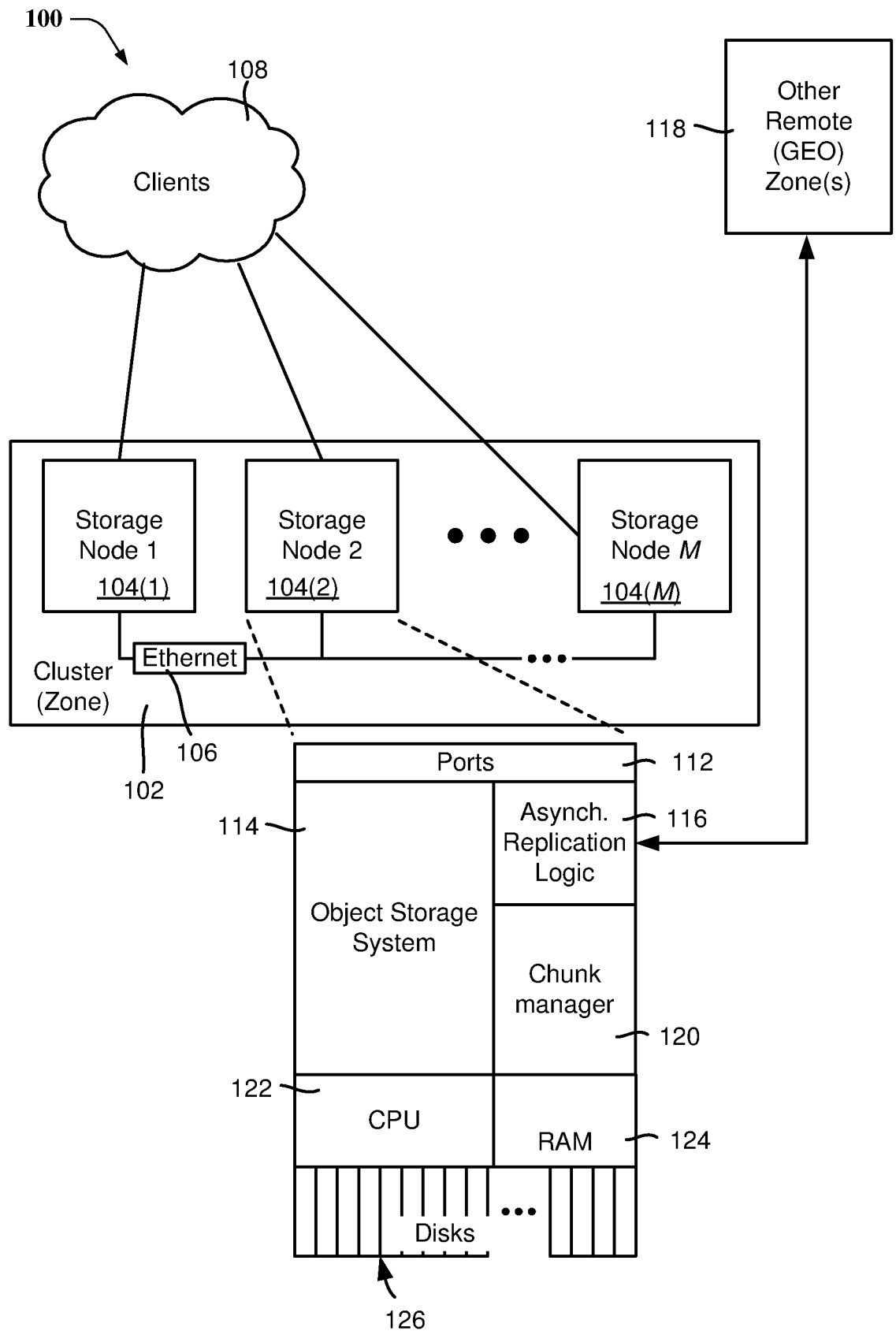
FIG. 1 illustrates an example cloud data storage system comprising that facilitates combining erasure-coded protection sets during meta chunk generation, according to one or more example implementations.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed object storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Example systems and methods disclosed herein, in one or more embodiments, relate to cloud storage systems that utilize erasure coding for data protection, such as, but not limited to an ECS™ platform. The ECS™ platform combines the cost advantages of commodity infrastructure with the reliability, availability and serviceability of traditional arrays. ECS™ uses erasure coding approach to protect user data. With erasure coding, a data portion (D) is divided into k fragments. During encoding operation redundant m coding fragments are created. In an aspect, encoding assures that the system can tolerate the loss of any m fragments. In an embodiment, k data fragments and m coding fragments created for a single data portion form a protection set. In one aspect, the ECS™ platform can comprise a cluster of nodes (also referred to as "cluster" herein) that delivers scalable and simple public cloud services with the reliability and/or control of a private-cloud infrastructure. Moreover, the ECS™ platform comprises a scale-out, cluster-based, shared-nothing object storage, which employs a microservices architecture pattern. The ECS™ platform can support storage, manipulation, and/or analysis of unstructured data on a massive scale on commodity hardware. As an example, ECS™ can support mobile, cloud, big data, content-sharing, and/or social networking applications. ECS™ can be deployed as a turnkey storage appliance or as a software product that can be installed on a set of qualified commodity servers and/or disks. The ECS™ scale-out and geo-distributed architecture is a cloud platform that can provide at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In an aspect, ECS™ does not rely on a file system for disk capacity management. Instead, ECS™ partitions disk space into a set of blocks of fixed size called chunks (e.g., having a chunk size of 128 MB). All user data is stored in these chunks and the chunks are shared. Typically, a chunk can comprise fragments of several different user objects. The chunk content can be modified in an append-only mode. When a chunk becomes full, it can be sealed and the content of a sealed chunk is immutable. Further, ECS™ does not employ traditional data protection instructions like mirroring or parity protection. Instead, ECS™ utilizes erasure coding for data protection. A chunk can be divided into indexed portions (e.g., data fragments or object segments), for example, by a chunk manager. An index of an object segment can be a numerical value assigned by the chunk manager and utilized for erasure coding. Moreover, the index of the object segment can be utilized to determine a coefficient, within an erasure coding matrix (e.g., the index can be utilized to determine a row and/or column of the matrix), which is to be combined (e.g., multiplied) with the object segment to generate a corresponding coding fragment for the chunk. In an aspect, a data chunk may comprise a plurality of object segments having a size of 2 MB that are appended in the data chunk. Thus, a data chunk of size 128 MB can have 64 object segments appended together. In general operation, a read request comprises a request to read (e.g., extract) single object segment. In an aspect, ECS™ is a cloud storage that supports geographically distributed setups consisting of two or more zones (e.g. sites). The corresponding feature is called GEO. GEO can be used to provide an additional protection of user data by means of replication. The replication mechanism works at the chunks level. In an aspect, a chunk with data is replicated to one remote site only. ECS™ may use GEO erasure coding technique to minimize capacity overhead associated with GEO data protection. Although the systems and methods disclosed herein have been described with respect to object storage systems (e.g., ECS™), it is noted that the subject specification is not limited to object storage systems and can be utilized for most any storage systems that utilize erasure coding for data protection and chunks for disk capacity management. Thus, any of the embodiments, aspects, concepts, structures, functionalities or examples described herein are non-limiting, and the technology may be used in various ways that provide benefits and advantages in computing and data storage in general.

In some embodiments, the GEO system can employ a replication to single site mode, a replication to all sites mode, or a replication to one or more region mode depending on geographical considerations (e.g., distance and government rules on storing data), site or region storage size consideration (e.g., a site limited to storing 100 million data chunks). In a GEO system according to some embodiments, data chunks are continuously added to sites. In a GEO setup according to an aspect, a backup copy of the data chunk is created. In an aspect, a chunk with user data is replicated to one site mode comprises replicating a backup copy of the data chunk at a single site (disused in FIG. 3, below). For example, the data chunk is created at a primary site and a backup is stored at secondary site. In an aspect, a replication to all site mode comprises replicating a backup copy of data chunk at every site within the GEO system (discussed in FIG. 4). When a data storage a site reaches capacity, new sites are created. In an aspect, when number sites in GEO setup reach a threshold (e.g., 100 sites), the sites are divided into M regions, wherein one region may unite two or more sites (e.g., 50 regions, each having two sites). The regions may be based on geographical location. For example, the regions can by based on city, state, country, etc. The regions may be based on zip codes or any other suitable method to divide sites. In an aspect, a replication to one or more regions can comprise replicating a data chunk to one or more regions. In some embodiments, the data chunk can be replicated at a single site of a selected region. The advantage of replicating at region level is that it provides greater reliability of accessing the data chunk during site failure without having to store the data chunks at multiple sites, thereby reducing storage resources.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 shows part of a cloud data storage system such as ECS™ comprising a zone (e.g., cluster) 102 of storage nodes 104(1)-104(M), in which each node is typically a server configured primarily to serve objects in response to client requests (e.g., received from clients 108). The nodes 104(1)-104(M) can be coupled to each other via a suitable data communications link comprising interfaces and protocols such as, but not limited to, Ethernet block 106.

Clients 108 can send data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), includes an instance of an object storage system 114 and data services. For a cluster that comprises a "GEO" zone of a geographically distributed storage system, at least one node, such as the node 104(2), includes or coupled to reference tracking asynchronous replication logic 116 that synchronizes the cluster/zone 102 with each other remote GEO zone 118. Note that ECS™ implements asynchronous low-level replication, that is, not object level replication. Typically, organizations protect against outages or information loss by backing-up (e.g., replicating) their data periodically. During backup, one or more duplicate or deduplicated copies of the primary data are created and written to a new disk or to a tape, for example within a different zone. The term "zone"

as used herein can refer to one or more clusters that is/are independently operated and/or managed. Different zones can be deployed within the same location (e.g., within the same data center) and/or at different geographical locations (e.g., within different data centers).

In general, and in one or more implementations, e.g., ECS™, disk space is partitioned into a set of large blocks of fixed size called chunks; user data is stored in chunks. Chunks are shared, that is, one chunk may contain segments of multiple user objects; e.g., one chunk may contain mixed segments of some number of (e.g., three) user objects.

A chunk manager 120 can be utilized to manage the chunks and their protection (e.g., via erasure coding (EC)). Erasure coding was created as a forward error correction method for binary erasure channel. However, erasure coding can be used for data protection on data storages. During erasure coding (e.g., utilizing a k+m configuration), the chunk manager 120 can partition a piece of data (e.g., chunk) into k data fragments of equal size. During encoding, redundant m coding fragments are created so that the system can tolerate the loss of any m fragments. Typically, the chunk manager 120 can assign indices to the data fragments (and corresponding coding fragments). In an example, an index can be a numerical value (e.g., 1 to k) that is utilized for erasure coding. Moreover, the index of a data fragment can be utilized to determine a coefficient, within an erasure coding matrix, which is to be combined (e.g., multiplied) with the data fragment to generate a corresponding coding fragment for the chunk. For example, an index value can specify a row and/or column of the coefficient within the erasure coding matrix. As an example, the indices can be assigned based on a defined sequence, in a random order, based on a defined criterion (e.g., to increase probability of complementary data fragments), based on operator preferences, etc. The process of coding fragments creation is called encoding. The process of data fragments recovery using available data and coding fragments is called decoding.

In one example embodiment, GEO erasure coding can also be utilized, wherein if a distributed storage 100 is to tolerate the loss of any m zones/clusters/chunks, then GEO erasure coding can begin at each zone by replicating each new chunk to at least m remote zones. As a result, there are m backup copies of each chunk. Typically, there is one primary backup copy, which can be utilized for encoding. Encoding is performed by one zone for primary backup chunks and other zones replicate to it. Once a zone has k primary chunks replicated from different remote zones, the zone can perform encoding using the chunks replicated to it as data fragments. The chunk size is fixed, in ECS™, with padding or other data to complement, wherein the other data is added as needed. The result of encoding is m data portions of a chunk size. They are stored as chunks of a specific type called coding chunks. After encoding is complete, the zone can store one coding chunk locally and move other m−1 coding chunks to remote zones making sure all the k+m data and coding chunks are stored at different zones whenever possible. Afterwards, the primary backup chunks used for encoding and their peer backup chunks at other zones can be deleted.

In some embodiments, the chunk manager 120 can efficiently generate combined data protection sets during consolidating two or more erasure-coded data portions (e.g., normal/source chunks) that have a reduced sets of data fragments. As an example, chunk manager 120 can verify that the two or more erasure-coded data portions are complementary (e.g., do not have data fragments with the same index) and perform a summing operation to combine their corresponding coding fragments to generate a combined protection set. A CPU 122 and RAM 124 are shown for completeness; note that the RAM 124 can comprise at least some non-volatile RAM. The node includes storage devices such as disks 126, comprising hard disk drives and/or solid-state drives. It is noted that the storage devices can comprise volatile memory(s) or nonvolatile memory(s), or both volatile and nonvolatile memory(s). Examples of suitable types of volatile and non-volatile memory are described below with reference to FIG. 10. The memory (e.g., data stores, databases, tables, etc.) of the subject systems and methods is intended to comprise, without being limited to, these and any other suitable types of memory.

Figure 2:
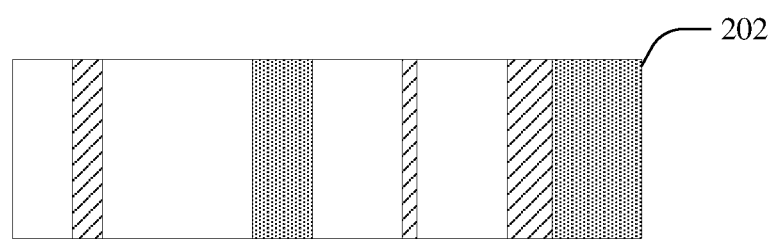
FIG. 2 illustrates an example layout of a chunk within an object storage system in accordance with an aspect of the specification.

FIG. 2 illustrates an example layout 200 of a chunk within an object storage system in accordance with an aspect of the specification. In an aspect, disk space of the object storage system can be partitioned into a set of blocks of fixed size called chunks. As an example, the chunk size can be 128 MB. Typically, user data is stored in these chunks and the chunks are shared. As shown in FIG. 2, a chunk 202 can comprise segments of several user objects (e.g., object 1 segments 204, object 2 segments 206, and object 3 segments 208). It is noted that the chunk layout depicted in FIG. 2. is one example and the chunks can have most any other layout with segments from one or more user objects. Chunk content is modified in an append-only mode. When the chunk becomes full enough, it is sealed. After the chunk is sealed, its content is immutable.

In an aspect, the chunk can be protected by employing erasure coding. During erasure coding, a chunk can be divided into k data fragments of equal size. To encode the chunk, redundant m coding fragments are created so that the system can tolerate the loss of any m fragments. The process of generating the coding fragments is called encoding. The process of data fragments recovery using available data and coding fragments is called decoding. As an example, the encoding operation can be represented with the equation below:

$$C_i = \Sigma_{j=1}^{k} C_{i,j} \quad (1)$$

wherein, $$C_{i,j} = X_{i,j} * D_j \quad (2)$$

and wherein, $X_{i,j}$ is a defined coefficient from a coding matrix (e.g., wherein i, j, and/or k can be most any integer). Further, j is an index assigned to the data fragment. It is noted that $D_j$ are independent data fragments and $C_i$ are coding fragments.

Additionally, or optionally, the systems and methods disclosed herein can support geographically distributed set-ups (GEO) comprising two or more zones. GEO can be used to provide an additional protection of user data by means of replication. Replication works at the chunk level, wherein a backup copy of a chunk stored in a primary zone can be replicated to one or more secondary zones. Each zone protects the chunks it stores. If a copy of a chunk becomes inaccessible, it can be recovered using its other copy. This process is called GEO recovery. In case of GEO erasure coding, remote backup copies of data chunks are used as data fragments and coding fragments created for such data fragments are stored as coding chunks.

Figure 3:
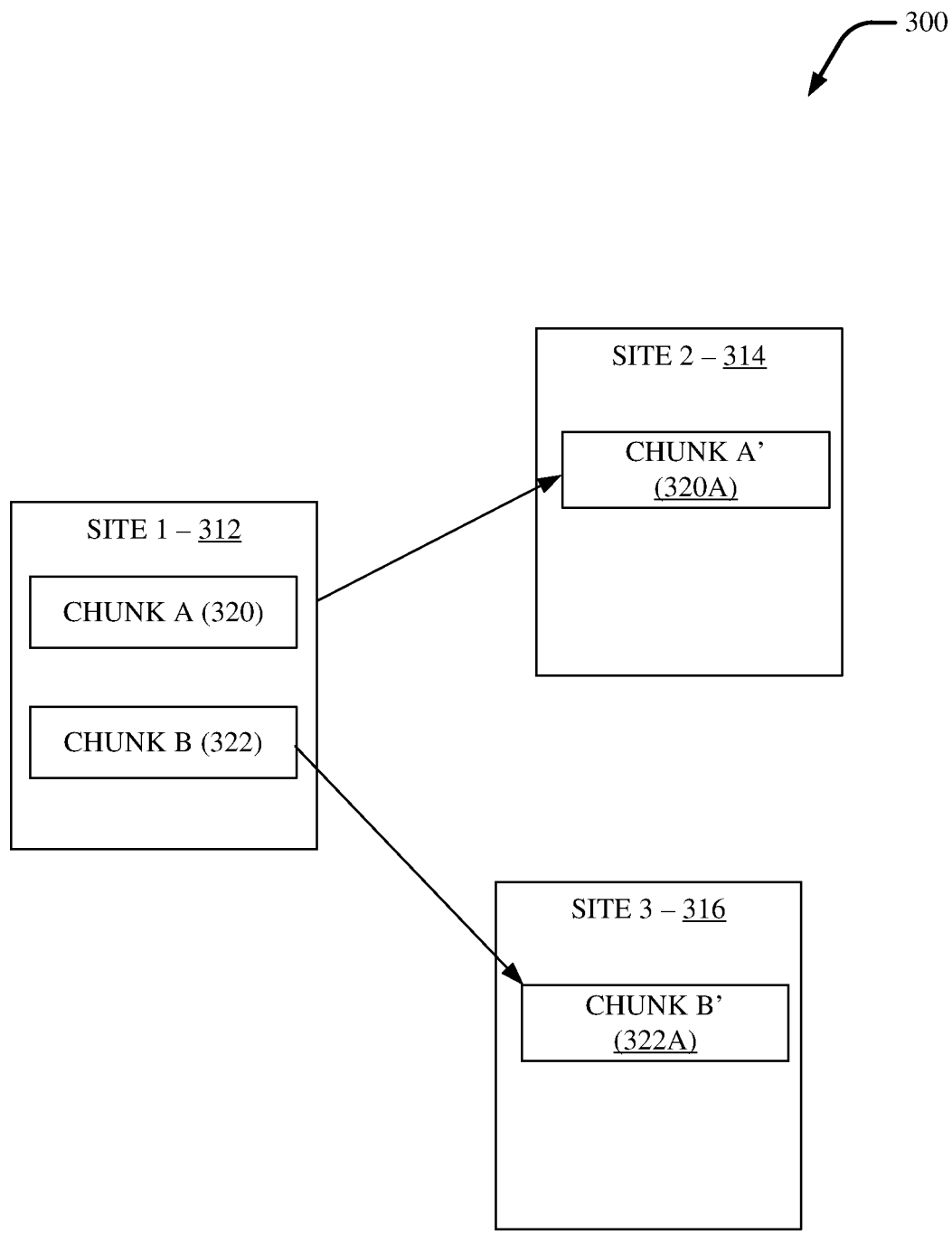
FIG. 3 illustrates an example of a geographically distributed storage system accordance with one or more embodiments described herein.

FIG. 3 illustrates an example of a geographically distributed storage system 300 accordance with one or more embodiments described herein. Repetitive description of like elements employed in respective embodiments is omitted for sake of brevity. According to some exemplary embodiments, the geographically distributed storage system 300 comprises three sites (e.g., zones or clusters), site 1 312, site 2 314, and site 3 316. In some embodiments, site 1 312 stores the primary data chunk A 320 and primary data chunk B 322. To provide additional protection from loss or inaccessible of data, the user data is replicated. In the replication to single site mode, the primary data chunk A 320 is replicated at site 2 314 (e.g., storing a backup copy, chunk A' 320A at site 2 314) and the primary data chunk B 322 is replicated at site 3 316 (e.g., storing a backup copy, chunk B' 322A at site 3 316). The advantage is that if primary site is not accessible for any reason, the user data can be retrieved from remote sites (e.g., site 2 314 for data chunk A 320 and site 3 316 for data chunk B 322).

Figure 4:
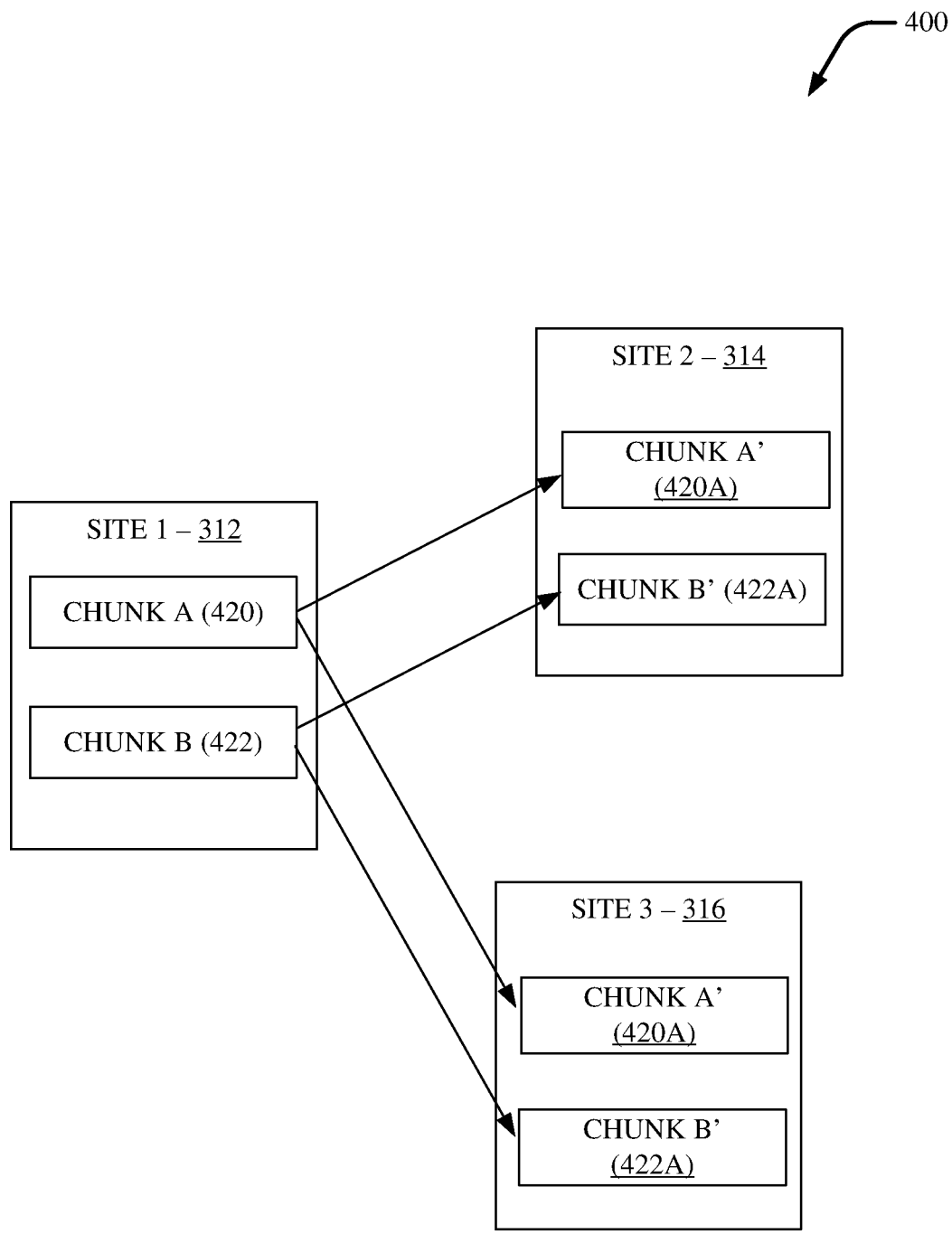
FIG. 4 illustrates an example of a geographically distributed storage system accordance with one or more embodiments described herein.

FIG. 4 illustrates an example of a geographically distributed storage system 400 accordance with one or more embodiments described herein. Repetitive description of like elements employed in respective embodiments is omitted for sake of brevity. According to some exemplary embodiments, the geographically distributed storage system 400 comprises three sites (e.g., zones or clusters), site 1 412, site 2 414, and site 3 416. To provide additional protection from loss or inaccessible of data, the user data is replicated. In the replication to all sites mode, the primary data chunk A 420 is replicated at site 2 414 and site 3 416 (e.g., storing a backup copy at all sites within the GEO system, site 2 414 and site 3 416) and the primary data chunk B 422 is replicated at site 2 414 and site 3 416 (e.g., storing a backup copy at all sites within the GEO system, site 2 414 and site 3 416). The advantage is that if primary site or additional sites are not accessible for any reason, the user data can be retrieved from any available remote sites (e.g., site 2 414 or site 3 416). It should be noted, that number sites in GEO system is not limited to three and that hundreds of sites can be employed to store data and replicated data.

Figure 5:
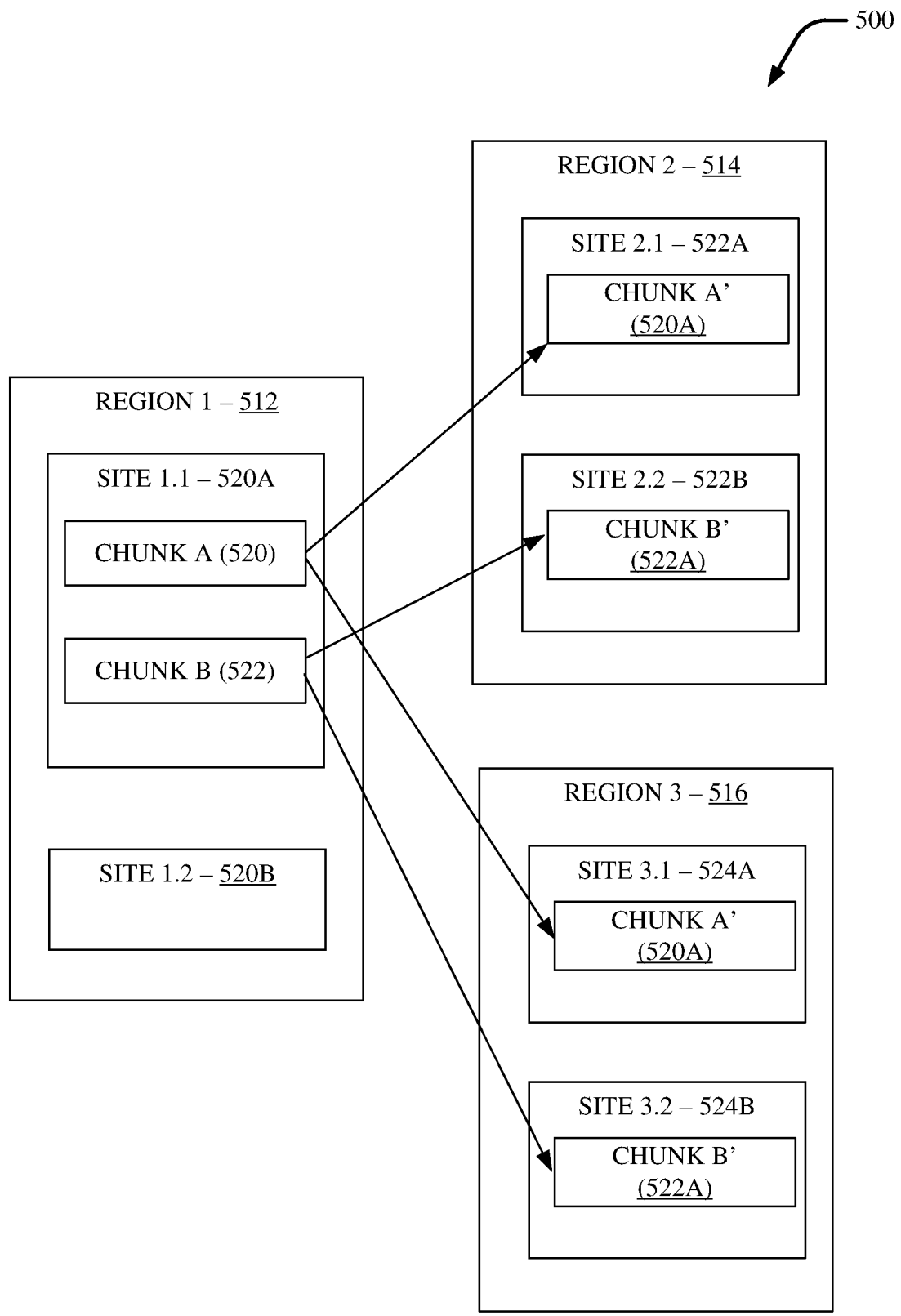
FIG. 5 illustrates an example of a geographically distributed storage system accordance with one or more embodiments described herein.

FIG. 5 illustrates an example of a geographically distributed storage system 500 accordance with one or more embodiments described herein. Repetitive description of like elements employed in respective embodiments is omitted for sake of brevity. When number of sites reach a threshold, the sites are divided into multiple regions. According to some exemplary embodiments, the geographically distributed storage system 500 comprises three regions, region 1 512, region 1 514, and region 1 516. A region can comprise one or more sites. For example, region 1 512 comprises site 1.1 550A and site 1.2 550B, region 2 514 comprises site 2.1 552A and site 2.2 552B, and region 3 516 comprises site 3.1 554A and site 3.2 554B. In the replication to one or more regions, a copy of the chunk is replicated stored in one or more regions. According to the exemplary embodiment, the data chunk is replicated at all the regions and at a single site within the region. For example, a backup copy of chunk A 520 is stored at region 2 514 and at region 3 516, and a backup copy of chunk B 522 is stored at region 2 514 and at region 3 516. According to an exemplary embodiment, when the site 1.1 550A of region 1 512 creates chunk A 520, a backup copy of the chunk (e.g., chunk A' 520A is created in each remote region. Namely, backup chunk A' 520A is created in site 2.1 552A of region 2 514 and backup chunk A' 520A is create in site 3.1 554A of region 3 516. When site 1.1 550A of region 1 512 creates chunk B 522, a backup copy of the chunk is created in each remote region. Namely, backup chunk B' 522A is created in site 2.2 552B of region 2 514 and backup chunk B' 522B is created in site 3.2 554B of region 3 516. Thus, 3 copies (the number of sites) of each chunk are available. The advantage is dividing sites into regions and storing a copy in each region save hardware and memory resources by reducing footprint of user data in a GEO environment. The data can be retrieved from a region that could geographically hundreds of miles away. It is unlikely that the event that caused a failure at a site will cause failure at site in a different region. Thus, by storing a copy by region provides greater reliability of accessing data during a site failure. With replication to one or more regions, the system can tolerate loss of all but one regions without data loss. Another advantage is that handling read requests for data may be reduced. Since, the read requests may be directed to a site that is continents away (e.g., Europe site requesting data read from Australia), the handling of such request may take considerably more time. However, in the exemplary embodiment, the read request can be handled by a site having the copy of data chunk and located in adjacent region.

Figure 6:
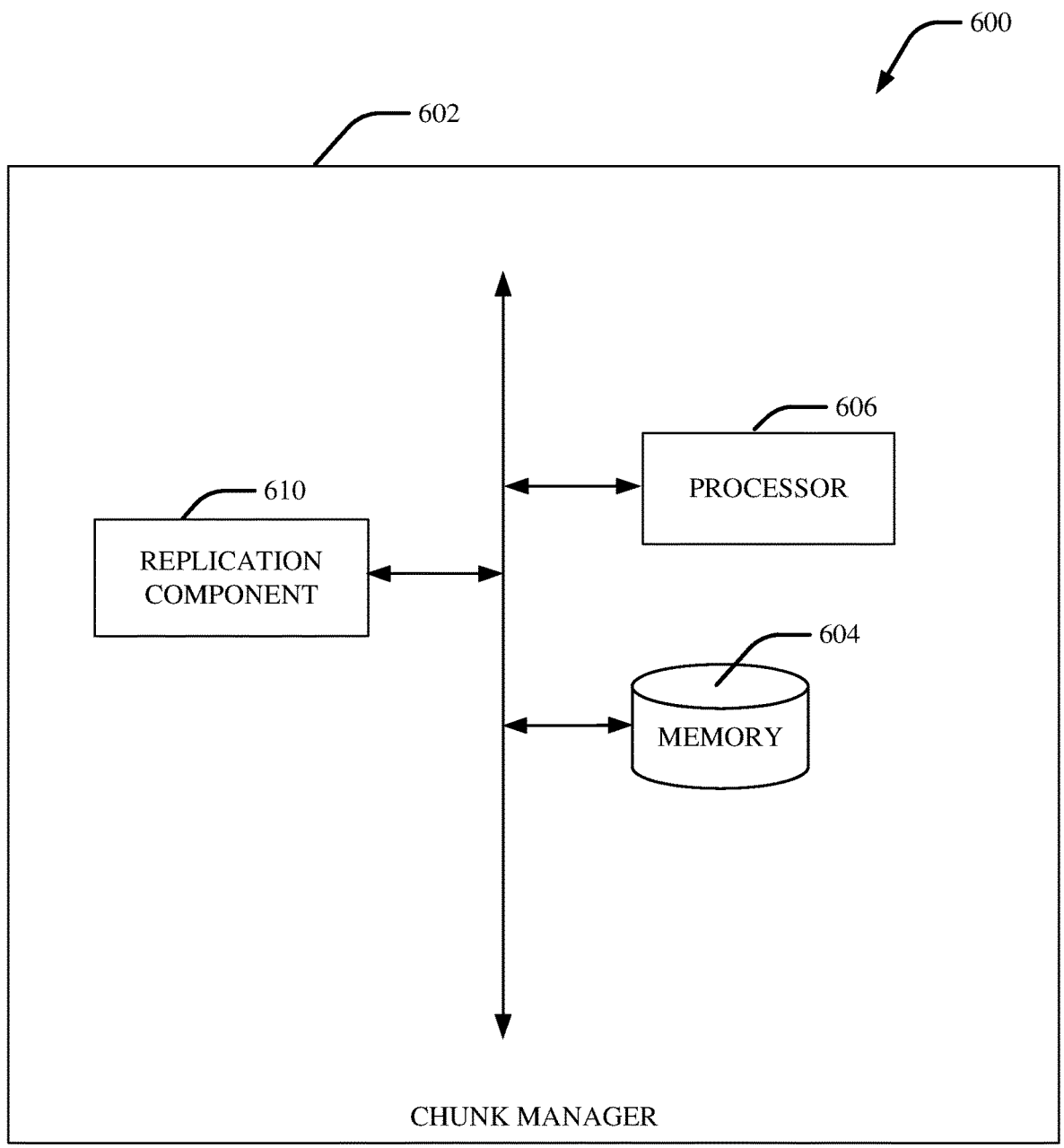
FIG. 6 illustrates an example of a chunk manager operational in a geographically distributed storage system accordance with one or more embodiments described herein.

FIG. 6 illustrates an example of a chunk manager 602 operational in a geographically distributed storage system 600 accordance with one or more embodiments described herein. Repetitive description of like elements employed in respective embodiments is omitted for sake of brevity. In some embodiments, the chunk manager 602 comprises a replication component 610, a processor 606, and memory 604 that are communicatively coupled to each other. In some embodiments, the chunk manager 602 processes replication of data employing the replication component 610. In some embodiments, when a data chunk is created, the data chunk is replicated using either a one site replication mode, all site replication mode or one or more region replication mode. In some embodiments, employing the processor 606 and the memory 604, the replication component 610 stores a first data chunk (e.g., the primary data chunk) at a first site (e.g., primary site) of a first region (e.g., primary region) in a geographically diverse data storage system. If determined that the data chunk needs to be replicated to one or more regions, the replication component 610 of the primary site determines a second region (e.g., secondary region) in the geographically diverse data storage system for storage of a first copy of the first data chunk. The first copy is stored at a second site (e.g., secondary site) located within the second region (e.g., secondary region). In some embodiments, the determination of the region and the site within the region that will store the copy of the first data chunk may be based on geography, available storage space at site, using a round robin scheme to cycle through all the sites or a combination therefrom. Once the secondary site has been determined, the chunk manager (not shown, but similar to chunk manager 602) of secondary site can determine the type of protection to provide for securing the data chunk. For example, but not limited to erasure coding. In some embodiments, based on prior failure rate, the replication component 610 may store an additional copy at second site within the secondary region. The information about the second site can be stored in memory 604 and can be provided to the primary site (e.g., stored in memory 604). In some embodiments, for added reliability, the replication component 610 can determine a third region (e.g., tertiary region) in the geographically diverse data storage system for storage of a second copy (e.g., tertiary chunk) of the first data chunk, wherein the second copy is stored at a third site (e.g., tertiary site) located within the third region and the second copy is protected by the third site.

In some embodiments, primary site (e.g., replication component 610 of primary site) scans available regions to identify a suitable secondary or tertiary region to store copies of data chunk. In some embodiments, the replication component 610 also identifies a suitable site within the secondary region and replicates the data chunk at the secondary site. The secondary site protects the secondary data chunk locally using for example, but not limited to, mirroring, parity or erasure coding techniques. In some embodiments, the replication component 610 also identifies a suitable site within the tertiary region and replicates the data chunk at the tertiary site. In some embodiments, the third copy may not be protected by the tertiary site, unless the system determines that protection is required due to loss or inaccessibility of either primary or secondary data chunk.

Aspects of the processor 606 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. In an aspect, memory 604 can store computer executable components and instructions. It is noted that the memory 604 can comprise volatile memory(s) or nonvolatile memory(s) or can comprise both volatile and nonvolatile memory(s). Examples of suitable types of volatile and non-volatile memory are described below with reference to FIG. 11. The memory (e.g., data stores, databases) of the subject systems and methods is intended to comprise, without being limited to, these and any other suitable types of memory. In some embodiments, the chunk manager 602 can reside in a zone and communicatively coupled to one or more of the remaining zones. In some embodiments, a single site may be designated as primary site within the geographical distributed storage system. The primary site may determine the region boundaries and threshold limits for sites and region. For example, the processor 606 of the primary site monitors the storage capacity of each sites to determine if a new region needs to be defined (e.g., when number of sites reach a threshold, the sites are divided into regions).

Figure 7:
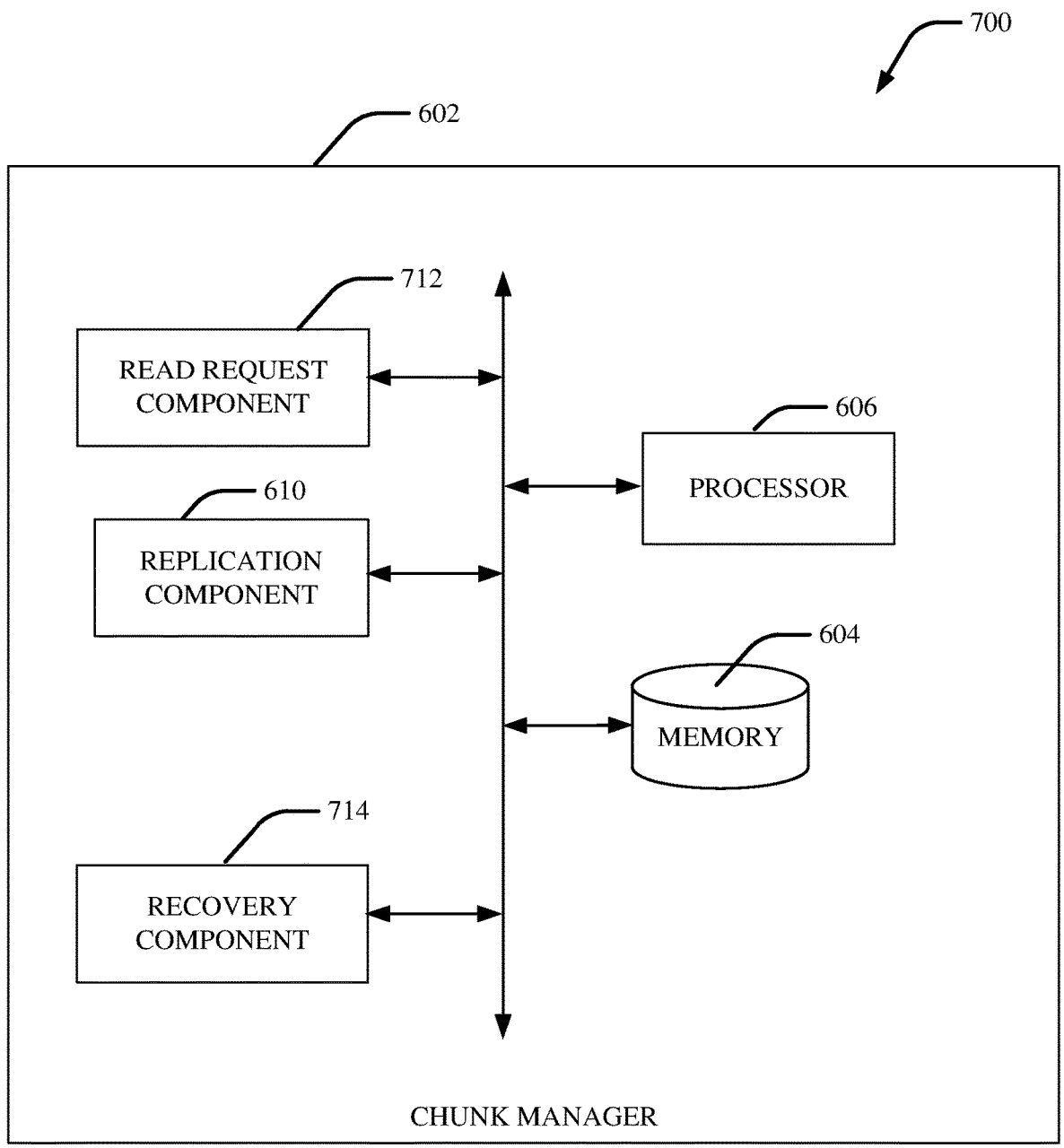
FIG. 7 illustrates an example of a chunk manager operational in a geographically distributed storage system accordance with one or more embodiments described herein.

FIG. 7 illustrates an example of the chunk manager 602 operational in a geographically distributed storage system 700 accordance with one or more embodiments described herein. Repetitive description of like elements employed in respective embodiments is omitted for sake of brevity. In some embodiments, the chunk manager 602 can further comprise a read request component 712 that processes read requests for a data portion of the chunk. If the primary data chunk is not available or inaccessible, the read request component 712 scans for the copy of the data chunk (e.g., sends a read request to a read request component (not shown) of the secondary site located within the secondary region). The read request component 712 may use the secondary data chunk to serve as read request.

In some embodiments, the chunk manager 602 can further comprise a recovery component 714 that handles data chunk recovery in the event of a site failure that causes the data chunk to become inaccessible. In the event of site failure, several data chunks are lost. The recovery of impacted chunks is handled one at a time by the recovery component 714. The recovery comprises recreating a site using available remaining available sites. For each chunk, a primary recovery site is found among the remaining site to drive the recovery of the data chunk. Based on availability, the primary site, secondary site or tertiary site can serve as the primary recovery site to drive the recovery of the data chunk. In some embodiments, all missing chunk copies may be re-created within the original regions. In the event of region failure, a primary recovery region is found among the remaining regions to drive the recovery of the missing chunks. Based on availability, the primary region, secondary region or tertiary region can serve as the primary recovery region to drive the recovery of the data chunk. In the event the primary site is not available or inaccessible, the secondary site becomes the primary site, the tertiary site becomes the secondary site, and a new site is selected as the tertiary site.

Figure 8:
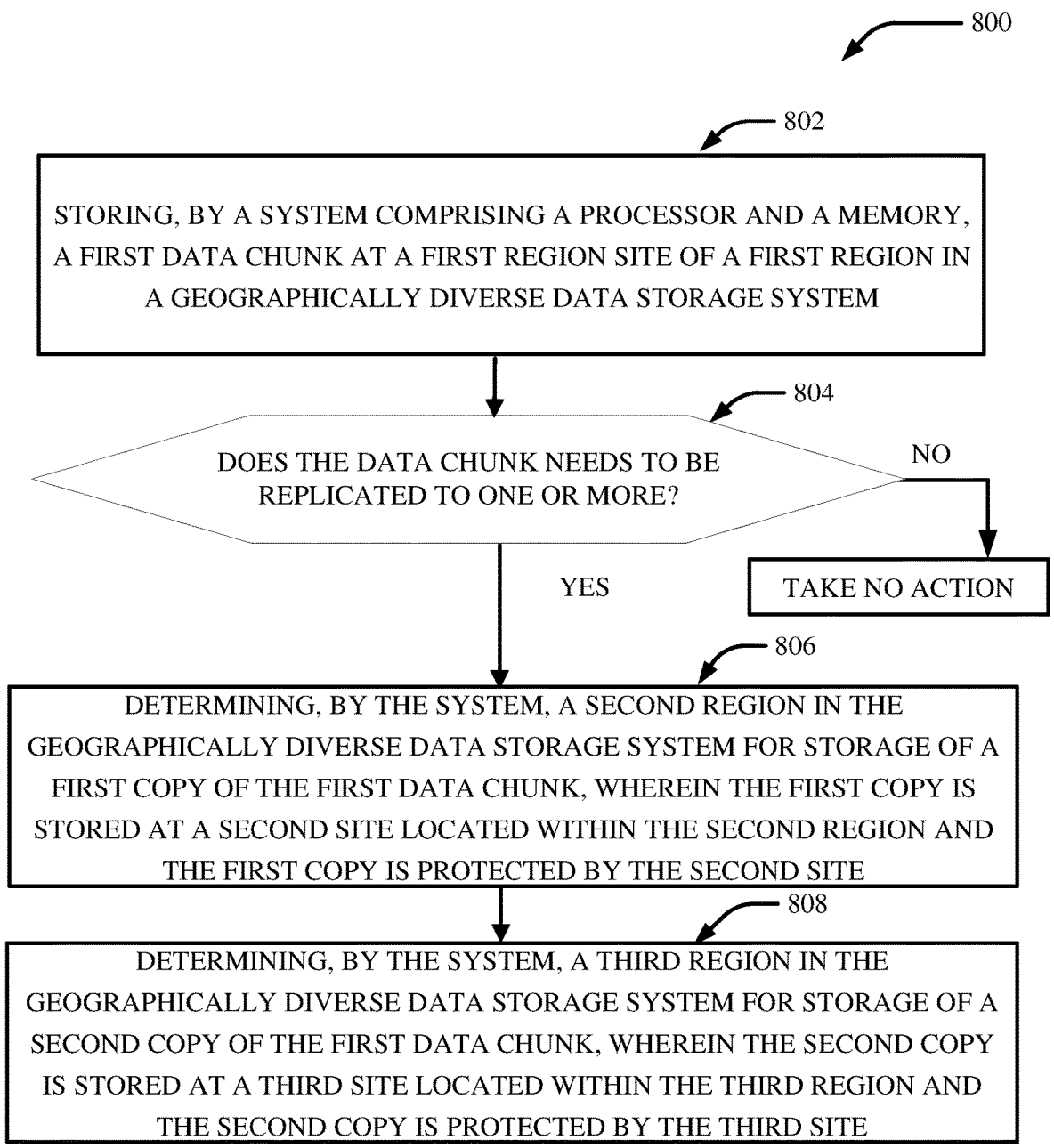
FIG. 8 depicts a diagram of an example, non-limiting computer implemented method that facilitates replication of data in geographically distributed storage system.

FIG. 8 depicts a diagram of an example, non-limiting computer implemented method that facilitates replication of data in geographically distributed storage system. Repetitive description of like elements employed in other embodiments described herein is omitted for sake of brevity. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts storing, by a system comprising a processor and a memory, a first data chunk at a first site of a first region in a geographically diverse data storage system. Operation 804 depicts determining if the data chunk needs to be replicated to one or more regions (e.g., where the number site has reached capacity). If the data chunk needs to be replicated to one or more regions, then perform operation 806. Otherwise, take no action. Operation 806 depicts determining, by the system, a second region in the geographically diverse data storage system for storage of a first copy of the first data chunk, wherein the first copy is stored at a second site located within the second region and the first copy is protected by the second site. determining, by the system, a third region in the geographically diverse data storage system for storage of a second copy of the first data chunk, wherein the second copy is stored at a third site located within the third region and the second copy is protected by the third site. The advantage of this method is that data chunks can be stored at different regions to increase accessibly during a failure of a site.

Figure 9:
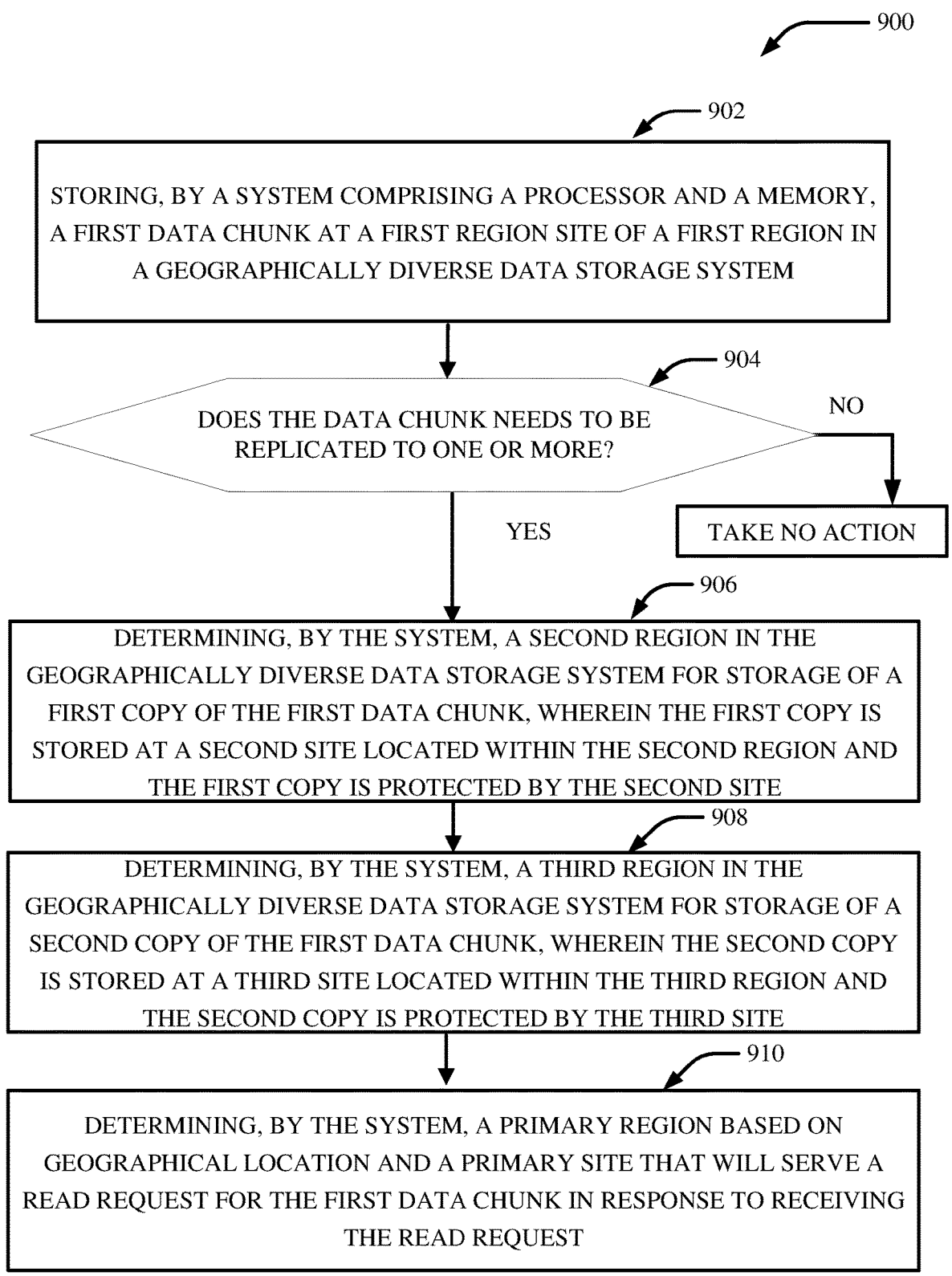
FIG. 9 depicts a diagram of an example, non-limiting computer implemented method that facilitates replication of data in geographically distributed storage system.

FIG. 9 depicts a diagram of an example, non-limiting computer implemented method that facilitates replication of data in geographically distributed storage system. Repetitive description of like elements employed in other embodiments described herein is omitted for sake of brevity. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts storing, by a system comprising a processor and a memory, a first data chunk at a first site of a first region in a geographically diverse data storage system. Operation 904 depicts determining if the data chunk to be replicated to one or more regions (e.g., where the number site has reached capacity). If the data chunk needs to be replicated to one or more regions, then perform operation 906. Otherwise, take no action. Operation 906 depicts determining, by the system, a second region in the geographically diverse data storage system for storage of a first copy of the first data chunk, wherein the first copy is stored at a second site located within the second region and the first copy is protected by the second site. Operation 908 depicts determining, by the system, a third region in the geographically diverse data storage system for storage of a second copy of the first data chunk, wherein the second copy is stored at a third site located within the third region and the second copy is protected by the third site. Operation 910 depicts determining, by the system, a primary region based on geographical location and a primary site that will serve a read request for the first data chunk in response to receiving the read request.

Figure 10:
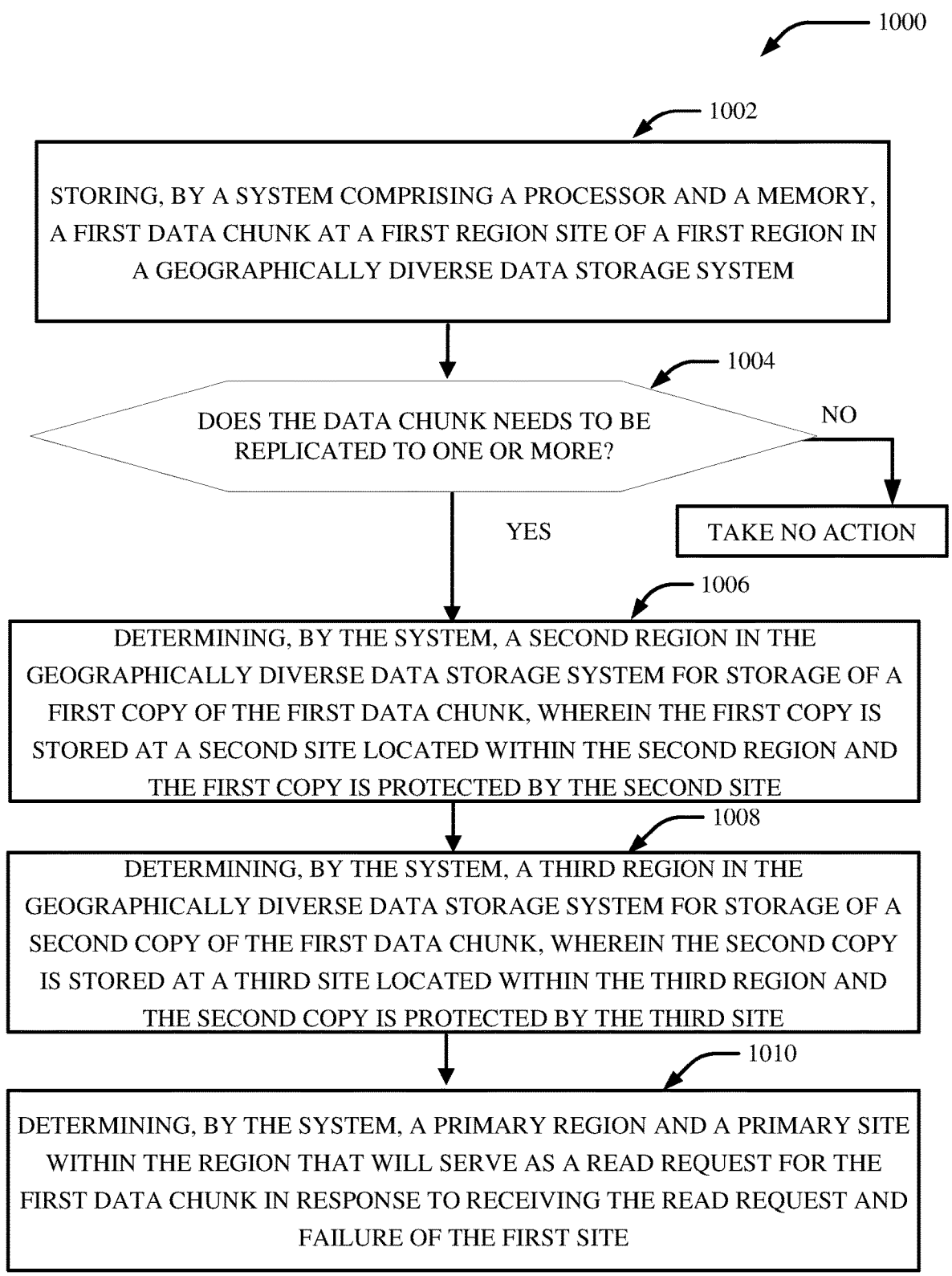
FIG. 10 depicts a diagram of an example, non-limiting computer implemented method that facilitates replication of data in geographically distributed storage system.

FIG. 10 depicts a diagram of an example, non-limiting computer implemented method that facilitates replication of data in geographically distributed storage system. Repetitive description of like elements employed in other embodiments described herein is omitted for sake of brevity. In some examples, flow diagram 1000 can be implemented by operating environment 1100 described below. It can be appreciated that the operations of flow diagram 1000 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts storing, by a system comprising a processor and a memory, a first data chunk at a first site of a first region in a geographically diverse data storage system. Operation 1004 depicts determining if the data chunk needs to be replicated to one or more regions (e.g., where the number site has reached capacity). If the data chunk needs to be replicated to one or more regions, then perform operation 1006. Otherwise, take no action. Operation 1006 depicts determining, by the system, a second region in the geographically diverse data storage system for storage of a first copy of the first data chunk, wherein the first copy is stored at a second site located within the second region and the first copy is protected by the second site. Operation 1008 depicts determining, by the system, a third region in the geographically diverse data storage system for storage of a second copy of the first data chunk, wherein the second copy is stored at a third site located within the third region and the second copy is protected by the third site. Operation 1010 depicts determining, by the system, a primary region and a primary site within the region that will serve as a read request for the first data chunk in response to receiving the read request and failure of the first site.

Figure 11:
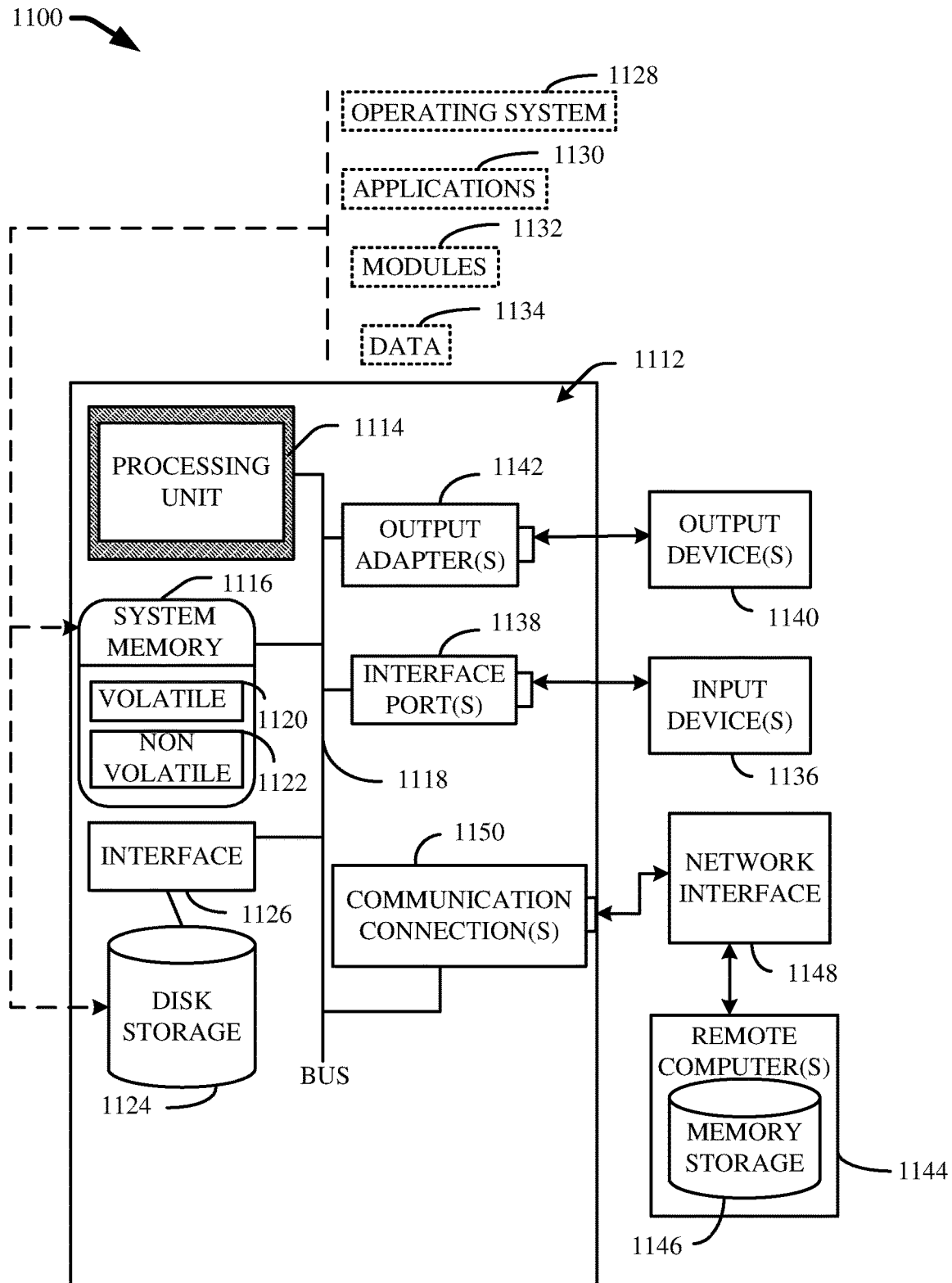
FIG. 11 illustrates a block diagram of an example computer operable to execute updating data protection set in a geographically distributed storage system.

FIG. 11 illustrates a block diagram of an example computer operable to execute recovery of an object segment of a deleted/inaccessible data chunk stored in a geographically distributed storage environment. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, (e.g., a carrier wave or other transport mechanism), and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference to FIG. 11, a block diagram of a computing system 1100 operable to execute the disclosed systems and methods is illustrated, in accordance with an embodiment. Computer 1112 comprises a processing unit 1114, a system memory 1116, and a system bus 1118. As an example, the component(s), server(s), client(s), node(s), cluster(s), system(s), zone(s), module(s), agent(s), engine(s), manager(s), and/or device(s) disclosed herein with respect to systems 400-1000 can each include at least a portion of the computing system 1100. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), comprising routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth®, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth® wireless technologies. Thus, the communication can be a predefined structure as with a conventional network or simply an ad hoc communication between at least two devices.

The computing system 1100 is operable to communicate with any wireless devices or entities operatively disposed in wireless communication, e.g., desktop and/or portable computer, server, communications satellite, etc. This includes at least Wi-Fi and Bluetooth® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1002.11 (a, b, g, n, etc.) to provide secure, reliable, fast wireless connectivity. A Wi-Fi network can be used to connect computers to each other, to the Internet, and to wired networks (which use IEEE 1002.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.1 in) data rate for example, or with products that contain both bands (dual band), so the networks can provide real-world performance similar to the basic 11BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to dynamically perform operations as described herein.

A classifier can be a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   storing a first data chunk at a first site of a first region in a geographically diverse data storage system;
   determining a second region for first storage of a first copy of the first data chunk, wherein the first copy is stored at a second site located within the second region and the first copy is protected by the second site; and
   determining a third region for second storage of a second copy of the first data chunk, wherein the second copy is stored at a third site located within the third region.

2. The system of claim 1, wherein the operations further comprise:
   determining a primary region and a primary site to handle a read request for the first data chunk in response to failure of the first site.

3. The system of claim 1, wherein the operations further comprise:
   determining a primary region and a primary site to handle a read request for the first data chunk in response to failure of the first region.

4. The system of claim 1, wherein the operations further comprise:
   protecting the first data chunk using a chunk protection operation, wherein a first device at the first site selects the chunk protection operation; and
   protecting the first copy of the first data chunk using the chunk protection operation, wherein a second device at the second site selects the chunk protection operation.

5. The system of claim 1, wherein performing the determining of the second region comprises:

employing a region selection operation by a device at the first site.

6. The system of claim 1, wherein the determining of the second region comprises:
    determining at least one site to store the first copy of the first data chunk, and wherein a device at the first site employs a site selection operation to determine the second site for the storage of the first copy of the first data chunk.

7. The system of claim 1, wherein the determining of the third region comprises:
    determining at least one site to store the second copy of the first data chunk, and wherein a device at the first site employs a site selection operation to determine the third site for the storage of the second copy of the first data chunk.

8. The system of claim 1, wherein the operations further comprise:
    designating the second site as a primary recovery site to recover the first data chunk in an event of a failure of the first site; and
    in response to the failure of the first site, initiating a recovery operation by a device of the primary recovery site to recover the first data chunk.

9. The system of claim 1, wherein the operations further comprise:
    initiating a recovery operation by a device of the first site to recover the first copy of the first data chunk stored at the second site in response to determining a first failure of the second site has occurred; and
    initiating the recovery operation by the device of the first site to recover the second copy of the first data chunk stored at the third site in response to determining a second failure of the third site has occurred.

10. The system of claim 1, wherein the operations further comprise:
    designating the third site as a primary recovery site to recover the first data chunk in an event of a failure of the first region; and
    in response to the failure of the first region, initiating a recovery operation by the primary recovery site to recover the first data chunk.

11. A method, comprising:
    storing, by a system comprising a processor and a memory, a first data chunk at a first site of a first region in a geographically diverse data storage system;
    determining, by the system, a second region for first storage of a first copy of the first data chunk, wherein the first copy is stored at a second site located within the second region and the first copy is protected by the second site; and
    determining, by the system, a third region for second storage of a second copy of the first data chunk, wherein the second copy is stored at a third site located within the third region.

12. The method of claim 11, further comprising:
    determining, by the system, a primary region based on a geographical location and a primary site to handle a read request for the first data chunk in response to receiving the read request.

13. The method of claim 11, further comprising:
    determining, by the system, a primary region and a primary site within the primary region to handle a read request for the first data chunk in response to receiving the read request and failure of the first site.

14. The method of claim 11, wherein the determining of the second region comprises:
    determining at least one site to store the first copy of the first data chunk, and wherein the first site employs a site selection operation to determine the second site for the storage of the first copy of the first data chunk.

15. The method of claim 11, wherein the determining of the third region comprises:
    determining at least one site to store the second copy of the first data chunk, and wherein the first site employs a site selection operation to determine the third site for the storage of the second copy of the first data chunk.

16. A non-transitory machine-readable medium, comprising executable instructions that, when executed by a processor, facilitate performance of operations, comprising:
    storing a first data chunk at a first site of a first region in a geographically diverse data storage system;
    determining a second region for storing a first copy of the first data chunk, wherein the first copy is stored at a second site located within the second region and the first copy is protected by the second site; and
    determining a third region for storing a second copy of the first data chunk, wherein the second copy is stored at a third site located within the third region.

17. The non-transitory machine-readable medium of claim 16, wherein the operations further comprise:
    determining a primary region and a primary site within the primary region to handle a read request for the first data chunk in response to failure of the first site;
    initiating a recovery operation by the first site to recover the first copy of the first data chunk stored at the second site in response to determining a failure of the second site; and
    initiating the recovery operation by the first site to recover the second copy of the first data chunk stored at the third site in response to determining the failure of the third site.

18. The non-transitory machine-readable medium of claim 16, wherein the operations further comprise:
    protecting the first copy of the first data chunk using a chunk protection operation, wherein the second site selects the chunk protection operation.

19. The non-transitory machine-readable medium of claim 16, wherein the determining of the second region comprises employing a region selection operation by the first site and determining at least one site to store the first copy of the first data chunk, and wherein the first site employs a site selection operation to determine the second site for storing the first copy of the first data chunk.

20. The non-transitory machine-readable medium of claim 16, wherein the determining of the third region comprises:
    determining at least one site to store the second copy of the first data chunk, and wherein the first site employs a site selection operation to determine the third site for storing the second copy of the first data chunk.

* * * * *